Patented Sept. 16, 1924.

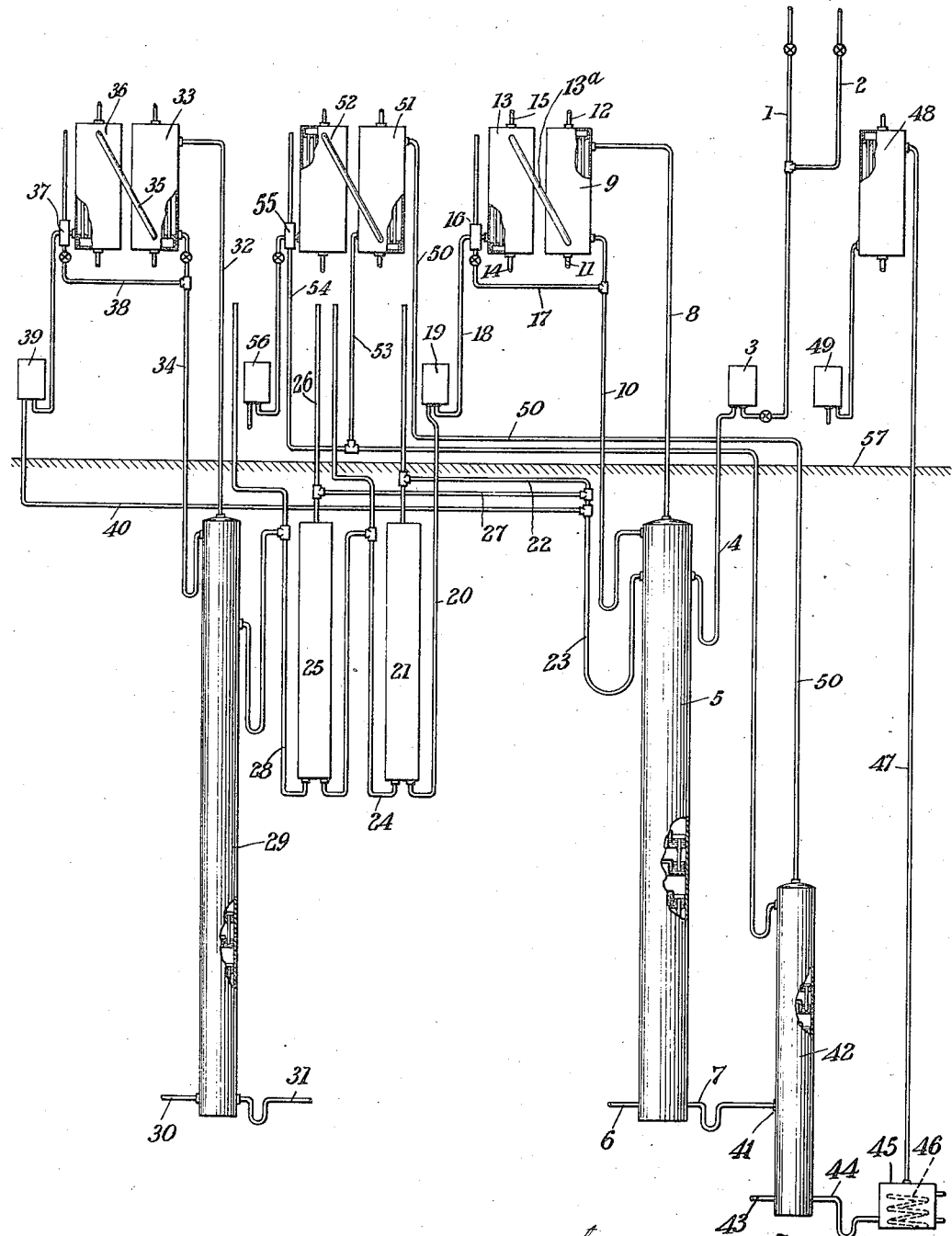

1,508,436

UNITED STATES PATENT OFFICE.

ARTHUR A. BACKHAUS, OF BALTIMORE, MARYLAND, ASSIGNOR TO U. S. INDUSTRIAL ALCOHOL CO., A CORPORATION OF WEST VIRGINIA.

APPARATUS FOR RECOVERING ABSOLUTE ALCOHOL FREE FROM FOREIGN MATERIALS.

Application filed April 5, 1921. Serial No. 458,846.

*To all whom it may concern:*

Be it known that I, ARTHUR A. BACKHAUS, a citizen of the United States, residing at Baltimore, State of Maryland, have invented certain new and useful Improvements in Apparatus for Recovering Absolute Alcohol Free from Foreign Materials, of which the following is a specification.

My invention relates particularly to an apparatus designed to obtain alcohols having a high strength by removing water from the same but it has especial reference to the production of absolute alcohol free from foreign materials, such, for example, as non-volatile constituents, xylol and traces of benzol.

The object of my invention is to provide an apparatus whereby alcohols may be separated from water and especially by means of which absolute alcohol may be obtained in accordance with a commercially practicable system and in such a manner as to avoid the presence of foreign materials.

More particularly, the object of my invention is to provide an apparatus for obtaining such alcohol free from foreign materials, based upon the utilization of a third liquid which is miscible with the alcohol but substantially immiscible with water, and which is of such a character that when the three constitutents are present vapors of the same are evolved by distillation containing a considerable percentage of water and the third liquid so that all the water and the third liquid may be removed in this way from the residual constituent, which is the alcohol. The evolved vapors are comprised of a ternary mixture of the three constituents. This third liquid may be of any one of a number of different compounds, such, for example, as benzol, carbon tetrachloride, hexane, etc., but I prefer to use benzol.

One of the objects of my invention is to provide such an apparatus whereby absolute alcohol may be obtained free from non-volatile materials, as well as less volatile residues such as xylol, and free, also, from any traces of benzol.

Further objects of my invention will appear from the detailed description thereof contained hereinafter.

While my invention is capable of embodiment in many different forms, I have shown only one form of the same in the accompanying drawings, in which The figure is a diagrammatic representation of an apparatus made in accordance with my invention.

In the drawings I have shown a valved inlet pipe 1 for feeding continuously into the apparatus an alcohol mixed with water and which, by way of example, may feed to the system ethyl alcohol having a strength of 95%. Leading into the pipe 1 there is a valved supply pipe 2 for supplying initially the desired quantity of the third liquid, as, for example, benzol, and for supplying to the system additional amounts of benzol to replace the small quantities thereof which are lost by evaporation therefrom. The alcohol and benzol are fed to the system in proportions such that in the system, at any given time, there would be approximately equal parts by weight of 95% alcohol and benzol but preferably a slightly smaller quantity of the benzol than of the 95% alcohol. The valved pipe 1 leads into a tailbox 3 which is connected by a liquid sealed pipe 4 to a dehydrating column 5 which is constructed in any suitable manner but which may have, for example, a plurality of plates the same as in the case of the usual alcohol rectifying column. The column 5 has at the bottom an inlet 6 for steam for heating the column indirectly.

Vapors are evolved from the column comprising approximately 74% by weight of alcohol, 19% by weight of water, and 7% by weight of benzol and substantially anhydrous alcohol flows from the liquid sealed outlet pipe 7. The evolved vapors pass out by means of a pipe 8 into a dephlegmator 9 which is connected by a liquid sealed pipe 10 to the top plate of the column. The dephlegmator is cooled in the usual way with the aid of water inlet and outlet pipes 11 and 12. The uncondensed vapors from the dephlegmator 9 pass into a condenser 13 through a pipe 13ª, the temperature in which is at approximately 64.9° C., said condenser being cooled by water passing through inlet and outlet pipes 14 and 15 and the condensate therefrom enters a vented sight-glass 16 from which a portion of the condensate passes through a valved pipe 17 to the pipe 10 and thence to the top of the column 5. The main portion of the condensate is conducted by a pipe 18 to a tailbox 19 and thence by a pipe 20 to a separating chamber 21. The liquid received in the separating chamber immediately separates into two liquid phases forming layers, the upper layer of which is rich in benzol but poor in alcohol and water, while the lower layer is rich in alcohol and water but poor in benzol. The composition of the respective layers is approximately as follows: The upper layer contains approximately 81% by weight of benzol, 4% by weight of water, and 15% by weight of alcohol, while the lower layer contains approximately 10% by weight of benzol, 35% by weight of water, and 55% by weight of alcohol. The upper layer is conveyed by a vented pipe 22 having a liquid seal 23 back to the tower 5 while the lower layer passes by a vented pipe 24 to a scrubber 25. In order to remove the remainder of the benzol, water is introduced into the scrubber 25 by a pipe 26 thus producing therein two layers of liquid, the upper layer of which contains the remainder of the benzol. The benzol layer is conducted from the scrubber by a vented pipe 27 to the liquid seal 23 and thence to the tower 5, while the lower layer is conveyed through a vented liquid seal pipe 28 to an alcohol rectifying column 29 having a steam inlet pipe 30 in the usual way for indirect heating and a liquid sealed drawoff pipe 31 for water at the bottom of the column. The lower portion of the column 29 is maintained at a temperature just above 100° C. The evolved alcohol vapors containing some water pass out of the top of the column through a pipe 32 to a dephlegmator 33, constructed substantially the same as the dephlegmator 9 and which is arranged to return the condensate therein to the top of the column 29 by a liquid sealed pipe 34. The vapors from the dephlegmator 33 pass through a pipe 35, the vapors in which are at a temperature of approximately 70° C., to a condenser 36 constructed the same as the condenser 13. The condensate from the condenser 36, which comprises approximately 95% alcohol enters a vented sight-glass 37 and a portion of the same passes back through a valved pipe 38 to the liquid sealed pipe 34 and thence to the top of the column 29, while the remainder thereof enters a tail-box 39 and is conveyed therefrom by a valved pipe 40 direct to the liquid sealed pipe 23 and thence to the column 5. The substantially anhydrous alcohol flowing from the bottom of the column 5 passes through the liquid sealed pipe 7 and an inlet 41 to a rectifying column 42 for finishing the treatment of the alcohol, said column being provided with a steam inlet pipe 43 for indirect heating and a liquid sealed drawoff pipe 44 for the materials separated from the alcohol and which comprise any non-volatile constituent, as well as the xylol which may have been introduced as an impurity with the benzol, together with any remaining traces of benzol not separated from the alcohol in the column 5. These separated materials pass into a flash-pot 45 where the vaporizable substances are driven off with the aid of a steam coil 46, the vapors being conducted through a pipe 47 to a condenser 48, the outlet from which leads to a tail-box 49. The volatilized substantially anhydrous alcohol passes out of the column 42 by a pipe 50 to a dephlegmator 51 and a condenser 52 constructed in the same manner as the dephlegmator 33 and condenser 36, so that a portion of the condensate is returned to the column 42 through pipes 53 and 54 while the main condensate passes out of the apparatus through a sight-glass 55 and a tail-box 56. The apparatus is arranged so that the portions thereof requiring observation are located upon an operating floor 57.

In carrying out my invention, the alcohol containing water and the benzol is fed into the column 5, the lower portion of which is maintained at a temperature slightly below 78.4° C. The vapors of alcohol, water and benzol will be distilled from the top of the column 5 thus leaving behind substantially anhydrous alcohol which passes out of the bottom of the column through the pipe 7. The evolved vapors pass into the dephlegmator 9, whence some of the condensate is returned to the topmost plate in the column 5, and at the same time a small portion of the condensate from the condenser 13 is also conveyed to the tower at the same point, thus sealing the uppermost plates in the column with a liquid of a constant composition and which is very close to the composition of the evolved vapors. This not only provides uniform conditions at the top of the tower but enables the apparatus to be conducted with a comparatively small quantity of benzol so that the condensate reaching the separating chamber 21 will be rich in the water to be removed. When the liquid condensate reaches the separating chamber 21 it immediately divides into two layers, the upper layer, comprised principally of benzol, being conveyed back to the tower 5, while the lower layer, comprised principally of alcohol and water but containing some benzol, is conducted to the scrubber 25 where water is added in the proportions of approximately 1 part by weight of water to 1 part by weight of the incoming liquid. This separates out the benzol into an upper layer which is conveyed back to the column 5, while the dilute alcohol is conducted to the alcohol rectifying column 29. This column is required merely to rectify the alcohol, said column at its lower portion being maintained at a temperature of approximately 100° C., the water from which passes out from the bottom of the column, while the alcohol substantially 95% in strength is collected as a condensate having a fixed composition and temperature which is returned to the column 5. Inasmuch as the alcohol returned to the column 5 has a definite composition and temperature, and as the benzol has been substantially entirely removed therefrom, the conditions in the upper portion of the column 5 are comparatively uniform so far as the character of the incoming alcohol is concerned. Furthermore, inasmuch as the bulk of the benzol is returned directly from the separating chamber 21 to the column 5, while the scrubbing is applied only to the small portion of the benzol recovered in the scrubber 25, the benzol is returned to the column 5 in a drier form than would otherwise be the case and this also conduces to uniformity in the operation of the apparatus. For the same reason less water is carried back into the column 5 and there is consequently a more effective separation of the alcohol from the water. By providing a system of this character in which the several parts of the system operate without a great degree of dependence upon one another it is possible to conduct the apparatus with great uniformity of results and in such a way that the failure of any portion of the system to function temporarily would not interfere with the effective operation of the system as a whole. For these reasons, furthermore, it is practicable to obtain absolute alcohol with a continuously operating apparatus. The substantially anhydrous alcohol which flows from the bottom of the column 5 contains some non-volatile matter, as well as the xylol carried into the system with the benzol as an impurity therein, together with some traces of benzol. The absolute alcohol is separated from these constituents in the column 42 from which it is recovered and discharged from the condenser 52 through the tail-box 56, while the volatilizable impurities, such as xylol, benzol, etc., are conveyed away at the lower end of the column 42 from which they are conducted to the flash-pot and thence elevated to the operating floor 57 to be condensed in the condenser 48 and discharged through the tail-box 49.

While I have described my invention above in detail I wish it to be understood that many changes may be made therein without departing from the spirit of the same.

I claim:

1. An apparatus which comprises a rectifying column, means for feeding a ternary mixture thereto, means for removing a single constituent therefrom, and means for rectifying said constituent.

2. An apparatus which comprises a rectifying column provided with a dephlegmator and a condenser, means for feeding a ternary mixture thereto, means for removing a single constituent therefrom near its bottom, and means for rectifying said constituent.

3. An apparatus for the manufacture of anhydrous alcohol which comprises a rectifying column, means for feeding a ternary alcohol mixture thereto, means for removing alcohol therefrom, and means for rectifying said alcohol.

4. An apparatus for the manufacture of anhydrous alcohol which comprises a rectifying column provided with a dephlegmator and a condenser, means for feeding a ternary alcoholic mixture thereto, a conduit at the bottom thereof connected to a second column, a condenser attached thereto, and means for withdrawing the remaining constituents of said mixture from the bottom of the second column.

In testimony that I claim the foregoing, I have hereunto set my hand this 26th day of January, 1921.

ARTHUR A. BACKHAUS.